Figure 1:
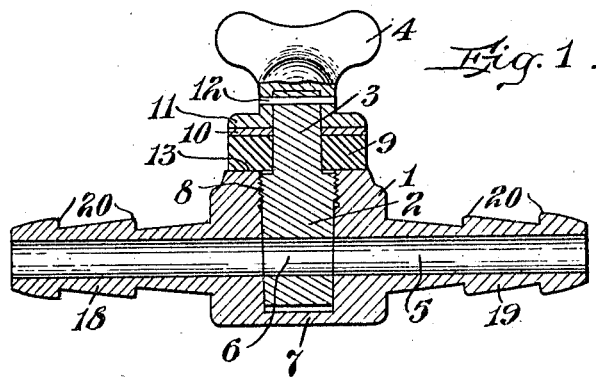

Z. L. SAULT.
STOP COCK.
APPLICATION FILED AUG. 28, 1909.

956,866.

Patented May 3, 1910.

Witnesses:
P. W. Pezzetti
F. R. Pouletone

Inventor:
Z. L. Sault,
by Wright, Brown,
Quinby & May Attys.

UNITED STATES PATENT OFFICE.

ZEPHANIAH L. SAULT, OF SOMERVILLE, MASSACHUSETTS.

STOP-COCK.

956,866.　　　　Specification of Letters Patent.　　Patented May 3, 1910.

Application filed August 28, 1909.　Serial No. 515,074.

*To all whom it may concern:*

Be it known that I, ZEPHANIAH L. SAULT, of Somerville, in the county of Middlesex and State of Massachusetts, have invented certain new and useful Improvements in Stop-Cocks, of which the following is a specification.

This invention relates to a stopcock, which has for its primary object to provide a valve for such a cock which is tight and will insure stoppage of the flow of fluid without leakage.

In carrying my invention into effect I produce a stopcock which has a solid bottom, that is one in which the valve does not project through the bottom, whereby one cause of leakage is eliminated. I mount the valve in the casing of the stopcock in such a way that when it is closed to shut off the flow of the fluid it is brought into especially tight contact with the surrounding walls, whereby the second cause of leakage is eliminated and an absolute stoppage of the flow of the fluid assured.

Referring to the drawings I have illustrated a stopcock in which the essentials of the main features of my invention are embodied, it being understood that the actual mechanical constructions are not in all instances the only ones which may be employed.

Figure 2:
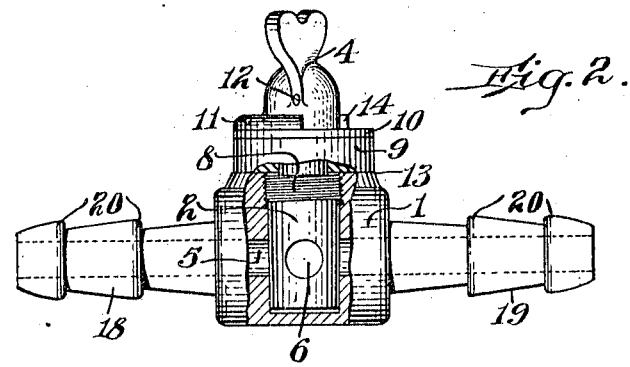
Figure 3:
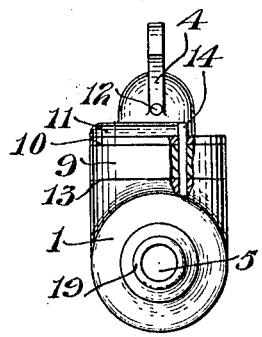
Figure 4:
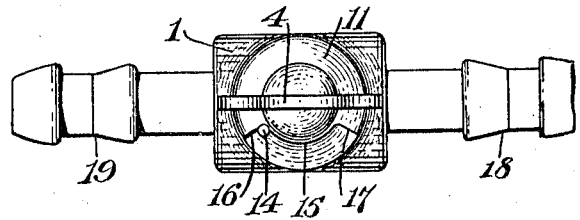

In the drawings, Figure 1 represents a longitudinal sectional view of such a stopcock. Fig. 2 is an elevation of the same partly broken away to show the valve in closed position. Fig. 3 is an end elevation of the device. Fig. 4 is a plan view of the device.

The same characters indicate the same parts in all the figures.

Referring to the drawings, the stopcock is shown as consisting of a casing 1, in which is contained a valve 2. This valve is inserted from the side of the casing and has a stem 3 projecting externally, to which is secured a handle 4. The casing has a passage 5 extending longitudinally through it for the flow of the fluid, which is to be regulated by the valve, and the stem also has a transverse passage 6 adapted to be placed in alinement with the passage 5 when flow of the fluid is desired. A quarter turn of the valve is sufficient to place it in the position shown in Fig. 2. When the passage 6 is out of line of the passage 5, the latter is obstructed by the valve.

One of the important features of the invention is the solid bottom of the valve casing, which absolutely prevents leakage at this point. It will be noted that the valve does not pass entirely through the casing as is usual with stopcocks and similar valve devices, but terminates somewhat short of the opposite side of the casing—that is, the socket in the casing in which the valve is contained extends only partially through the casing and the latter has thus a solid bottom. This leaves only one joint between the valve and casing which requires to be packed so as to prevent leakage.

Another valuable and important feature of the device is the tapering form of the valve 2 and the screw-threaded connection between the same and the casing. It will be noted that the valve is conical in form, having its inner end slightly smaller than its outer end. It is also provided with a screw-threaded portion 8, which engages internal threads in the casing near the mouth of the valve chamber. The valve is made with a close fit in the casing so that as it is turned in the direction which causes it to be screwed farther in, it makes a tight engagement with the walls of the casing. I have arranged the threads in such a way that when the valve is turned from the open to the closed position, the valve is screwed inward, thus making a close engagement with the walls of the chamber, and at the same time more tightly packing the point of its emergence from the chamber, whereby leakage from this point also is prevented.

Arising from the tapered form of the valve are the important advantages of elimination of friction in opening the valve and increased life for the stopcock. As a corollary to the tight closing of the valve by reason of its tapered form proceeds the converse proposition that in turning the valve to open the cock its tapered sides are withdrawn from the walls of the chamber in which it is contained by a slight amount but yet sufficient to avoid all friction and wear. The beginning of the opening movement of the valve withdraws it from lateral contact immediately so that the continued rotary opening movement is made out of contact with the surrounding walls of the chamber, or at least so nearly out of contact that there is no frictional resistance to its turning and no wear. That is, during the actual turning movement of the valve there is no friction or wear on account of the fact that tight engagement with the encompassing walls comes only at the instant of complete closure, whereby a tight closing of the stopcock is effected without causing the valve to be ground or worn away. As may be readily seen this almost complete elimination of wear enables the life of the stopcock, and particularly of the valve, to be indefinitely prolonged, for, whereas, in an ordinary stopcock, the life of the valve before it becomes too loose to be useful is a very few months at the most, in a cock made according to the present invention, the life of the valve is almost unlimited.

The means for packing the valve stem is an elastic washer 9, preferably of rubber or some other sufficiently elastic and impervious material, which surrounds the stem 3 of the valve and is contained between the casing and a washer 10. The latter is pressed by the elastic washer against a flange 11 on the valve handle 4, which handle is secured to the valve stem by a pin 12. When the valve is screwed into the casing, the elastic washer is compressed, bearing tightly against the annular face 13 of the valve chamber surrounding the valve stem and being caused at the same time by the distortion produced through the pressure of the washer 10 and cap 11 to embrace the valve stem tightly.

The valve is constrained to turn only in the direction necessary to produce the desired effects and is prevented from being entirely withdrawn by a pin or stud 14 which is set into the casing of the stopcock and projects through the washers 9 and 10 into a segmental recess 15 in the flange 11. The ends of this recess are bounded by shoulders 16 and 17, which alternately engage the pin. As will be understood from Fig. 4, the valve can be turned in only one direction to bring it from that position, which is the open one, to the closed position of Fig. 2, and this is the direction necessary to screw the valve farther into the casing, making an air-tight union with the walls thereof and compressing the elastic washer 9.

Another feature of my invention is the means employed for connecting the stopcock to a hose or sections of flexible tubing. From opposite ends of the stopcock project shanks or nipples 18, 19, through which the passage 5 extends. These shanks or nipples are adapted to be inserted into the ends of hose or tube sections and in order to prevent being forced out from the tubes by the pressure of the fluid passing thereto, they are provided with ribs or enlargements 20. Preferably these enlargements are somewhat conical, having abrupt shoulders on the sides next to the body of the stopcock and being tapered on the opposite sides. Preferably the shanks for part of the distance between these enlargements or shoulders are cylindrical, although this is not absolutely necessary, and the parts of the shanks between the innermost shoulders and the body of the stopcock may be of uniform diameter. Thereby a binding applied to the exterior of the hose is enabled to unite the hose with sufficient firmness to the nipples.

I claim,—

1. A stop cock comprising a casing having a longitudinal passage and a transverse socket, a plug valve contained in said socket and having a transverse aperture adapted to aline with said passage, said valve being tapered and in threaded engagement with the socket, whereby in being turned it is respectively withdrawn from and forced into tight engagement with the enveloping walls of the socket, a flange on the valve outside of said casing and an elastic impervious washer contained between the casing and said flange, said washer being compressed by the endwise movement of the valve due to the threaded engagement thereof with the socket, when turned so as to close the passage, whereby leakage past the valve to the exterior of the casing is prevented.

2. A non-leaking stopcock comprising a casing having a longitudinal passage, a plug valve set into said casing transversely of the passage and provided with a projecting stem, a washer surrounding said stem and a head on said stem between which and the casing said washer is contained, the valve being in threaded engagement with the casing, whereby in turning it to close the cock, said washer is compressed and leakage around the valve stem is prevented.

3. A stopcock comprising a casing, a plug valve contained therein and having a projecting stem, said valve being in threaded engagement with the casing, so that in being closed it is moved into the latter, a head upon the outer end of the valve stem and a resilient washer between said head and the casing, said washer being sufficiently resilient to take up the end motion of the valve when being closed or opened.

4. A stopcock having a plug valve threaded therein, so that in being turned it is moved in or out, a head on the projecting end of said valve, and a resilient washer surrounding said stem, and compressed between said head and the body of the stopcock, said washer being sufficiently resilient to permit the in and out movement of the valve and to pack the latter when in its outermost position.

In testimony whereof I have affixed my signature, in presence of two witnesses.

ZEPHANIAH L. SAULT.

Witnesses:
P. W. PEZZETTI,
ARTHUR H. BROWN.